(12) United States Patent
Kojima et al.

(10) Patent No.: US 10,480,576 B2
(45) Date of Patent: Nov. 19, 2019

(54) BEARING DEVICE AND EXHAUST TURBINE TURBOCHARGER

(71) Applicant: MITSUBISHI HEAVY INDUSTRIES ENGINE & TURBOCHARGER, LTD., Sagamihara-shi, Kanagawa (JP)

(72) Inventors: Yuya Kojima, Tokyo (JP); Tatsuya Ishizaki, Tokyo (JP); Yosuke Dammoto, Tokyo (JP); Yoji Akiyama, Tokyo (JP)

(73) Assignee: MITSUBISHI HEAVY INDUSTRIES ENGINE & TURBOCHARGER, LTD., Kanagawa (JP)

(*) Notice: Subject to any disclaimer, the term of this patent is extended or adjusted under 35 U.S.C. 154(b) by 0 days.

(21) Appl. No.: 16/078,243

(22) PCT Filed: Mar. 1, 2016

(86) PCT No.: PCT/JP2016/056294
§ 371 (c)(1),
(2) Date: Aug. 21, 2018

(87) PCT Pub. No.: WO2017/149670
PCT Pub. Date: Sep. 8, 2017

(65) Prior Publication Data
US 2019/0048933 A1 Feb. 14, 2019

(51) Int. Cl.
*F16C 33/10* (2006.01)
*F16C 17/02* (2006.01)
(Continued)

(52) U.S. Cl.
CPC .......... *F16C 33/1045* (2013.01); *F01M 1/18* (2013.01); *F16C 33/106* (2013.01);
(Continued)

(58) Field of Classification Search
CPC .......... F16C 17/02; F16C 17/10; F16C 33/10; F16C 33/1025; F16C 33/6681;
(Continued)

(56) References Cited

U.S. PATENT DOCUMENTS

| 4,157,881 A * | 6/1979 | Kasuya ................ F01D 25/125 184/6.11 |
| 4,240,678 A * | 12/1980 | Sarle ..................... F01D 25/166 384/369 |
| 2014/0140865 A1 | 5/2014 | Uneura et al. |

FOREIGN PATENT DOCUMENTS

| GB | 1 529 185 A | 10/1978 |
| JP | 59-105931 A | 6/1984 |

(Continued)

OTHER PUBLICATIONS

Written Opinion of the International Searching Authority dated May 31, 2016 in PCT/JP2016/056294.
(Continued)

*Primary Examiner* — Alan B Waits
(74) *Attorney, Agent, or Firm* — Birch, Stewart, Kolasch & Birch, LLP

(57) ABSTRACT

The present invention improves the drainability of lubricating oil. The present invention comprises: a rotating shaft (14); a journal bearing that is provided to the rotating shaft (14) and rotationally supports the rotating shaft (14); a bearing housing part that houses the journal bearing; and a drain oil space chamber (47) that acts as an oil drainage passage that communicates with the bearing housing part, is provided along the periphery of the rotating shaft (14), and is formed to open downward. Within a region that is in and above a horizontal plane H that passes through the center of the rotating shaft (14), the smallest cross-sectional area of the oil drainage passage in a radial-direction cross-section thereof is on the anterior side in the rotational direction of (Continued)

the rotating shaft (14) with respect to a vertical plane P that passes though the center (O) of the rotating shaft (14), and the largest cross-sectional area of the oil drainage passage in the radial-direction cross-section is on the posterior side in the rotational direction of the rotating shaft (14) with respect to the vertical plane that passes through the center (O) of the rotating shaft (14).

3 Claims, 6 Drawing Sheets

(51) Int. Cl.
| | |
|---|---|
| *F01D 25/16* | (2006.01) |
| *F01M 1/18* | (2006.01) |
| *F01D 25/18* | (2006.01) |
| *F16C 17/18* | (2006.01) |
| *F16C 17/26* | (2006.01) |
| *F01M 11/00* | (2006.01) |
| *F01M 11/02* | (2006.01) |

(52) U.S. Cl.
CPC .......... *F01D 25/164* (2013.01); *F01D 25/166* (2013.01); *F01D 25/186* (2013.01); *F01M 2011/0033* (2013.01); *F01M 2011/021* (2013.01); *F05D 2220/40* (2013.01); *F05D 2250/15* (2013.01); *F05D 2250/73* (2013.01); *F05D 2260/609* (2013.01); *F16C 17/02* (2013.01); *F16C 17/18* (2013.01); *F16C 17/26* (2013.01); *F16C 2360/24* (2013.01)

(58) Field of Classification Search
CPC ...... F16C 27/02; F16C 2360/24; F16C 17/18; F16C 17/26; F01D 25/162; F01D 25/166; F01D 25/18; F01D 25/609; F01D 25/164; F01D 25/186; F02B 39/00; F05D 2220/40; F05D 2240/60; F05D 2250/15; F05D 2250/73; F05D 2260/609; F01M 2011/0033; F01M 2011/021; F01M 1/18
See application file for complete search history.

(56) References Cited

FOREIGN PATENT DOCUMENTS

| | | |
|---|---|---|
| JP | 2-46028 U | 3/1990 |
| JP | 2010-270673 A | 12/2010 |
| JP | 5029837 B2 | 9/2012 |
| JP | 2013-64510 A | 4/2013 |
| JP | 2014-15854 A | 1/2014 |
| JP | 2014-101826 A | 6/2014 |

OTHER PUBLICATIONS

Extended European Search Report dated Nov. 6, 2018 in corresponding European Application No. 16892514.7.
Office Action dated Apr. 9, 2019 issued in corresponding Japanese Application No. 2018-502918 with an English Translation.

* cited by examiner

BEARING DEVICE AND EXHAUST TURBINE TURBOCHARGER

TECHNICAL FIELD

The present invention relates to a bearing device and an exhaust turbine turbocharger to which the bearing device is applied.

BACKGROUND ART

In the related art, for example, PTL 1 discloses a bearing housing. In order to improve a resistance with respect to oil leakage in a seal portion, the bearing housing includes a shaft through-hole for passing through a bearing supporting a rotating shaft, and an oil discharge passage which receives a lubricating oil discharged from both ends of the shaft through-hole to discharge the lubricating oil from a lower potion, and the oil discharge passage includes two end oil passages which are respectively connected to both ends of the shaft through-hole, radially spread from both ends of the shaft through-hole, and receive the lubricating oil from the shaft through-hole, and a lower oil passage through which the lubricating oil is collected from each end oil passage and is guided to a lower discharge port. In addition, lateral extension oil passages which extend toward the other end oil passage side and are separated from each other on an upper side are connected to both right and left sides of at least one of the two end oil passages, each lateral extension oil passage extends to a position on the other end oil passage side from a line which connects an upper end portion of one end oil passage connected to the lateral extension oil passage and a center portion of the discharge port to each other, in the entire height direction, an upper end of each lateral extension oil passage extends to be inclined to the discharge port side in a direction parallel to a rotation axis of the rotating shaft from one end oil passage side toward the other end oil passage side so as to guide the lubricating oil of the one end oil passage to the lower oil passage.

CITATION LIST

Patent Literature

[PTL 1] Japanese Patent No. 5029837

SUMMARY OF INVENTION

Technical Problem

However, if the oil discharge passage including the extension passage is filled with the lubricating oil, a loss in a rotation of the rotating shaft is generated by a viscous resistance of the lubricating oil, and thus, a reduction in efficiency of an exhaust turbine turbocharger is generated. In addition, if the oil discharge passage including the extension passage is filled with the lubricating oil, the lubricating oil leaks, and thus, there is a concern that the lubricating oil may leak from a seal surface on a turbine side of the exhaust turbine turbocharger and sealability may decrease. Accordingly, it is preferable to further improve drainability of the lubricating oil.

The present invention is made to solve the above-described problems, and an object thereof is to provide a bearing device and an exhaust turbine turbocharger capable of improving drainability of the lubricating oil.

Solution to Problem

In order to achieve the above-described object, according to an aspect of the present invention, there is provided a bearing device including: a rotating shaft; a journal bearing which is provided on the rotating shaft and rotatably supports the rotating shaft; a bearing accommodation portion in which the journal bearing is accommodated; an oil discharge passage which communicates with the bearing accommodation portion, is provided along a periphery of the rotating shaft, and has an opened lower portion, in which in a region above a horizontal plane passing through a center of the rotating shaft, the oil discharge passage has the minimum cross-sectional area in a radial cross section on an anterior side in a rotation direction of the rotating shaft based on a vertical plane passing through the center of the rotating shaft and has the maximum cross-sectional area in the radial cross section on a posterior side in the rotation direction of the rotating shaft based on the vertical plane passing through the center of the rotating shaft.

According to this bearing device, the lubricating oil which has reached the oil discharge passage flows in the rotation direction of the rotating shaft. Moreover, the lubricating oil flowing through the region above the horizontal plane passing through the center of the rotating shaft flows from the minimum cross-sectional area side of the oil discharge passage to the maximum cross-sectional area side and is discharged from a lower portion of the oil discharge passage. In addition, in the region below the horizontal plane passing through the center of the rotating shaft, the lubricating oil is directed toward the minimum cross-sectional area side from the lower portion of the oil discharge passage in the rotation direction of the rotating shaft, and thus, it is possible to prevent the lubricating oil from reflowing to the region above the horizontal plane. As a result, it is possible to improve drainability of the lubricating oil.

Moreover, in the bearing device of the present invention, the oil discharge passage is formed to be gradually enlarged from the minimum cross-sectional area to the maximum cross-sectional area in the rotation direction of the rotating shaft.

According to this bearing device, the lubricating oil which has reached the oil discharge passage flows through the passage which is gradually enlarged in the rotation direction of the rotating shaft from the minimum cross-sectional area to the maximum cross-sectional area, and is discharged from the lower portion of the oil discharge passage. As a result, it is possible to improve drainability of the lubricating oil.

Moreover, in the bearing device of the present invention, the oil discharge passage is formed so as to be abruptly enlarged from the minimum cross-sectional area to the maximum cross-sectional area in the rotation direction of the rotating shaft.

According to this bearing device, the lubricating oil which has reached the oil discharge passage flows through the passage which is abruptly enlarged in the rotation direction of the rotating shaft from the minimum cross-sectional area to the maximum cross-sectional area, and is discharged from the lower portion of the oil discharge passage. As a result, it is possible to improve drainability of the lubricating oil.

Moreover, in the bearing device of the present invention, the oil discharge passage has the minimum cross-sectional area continuously to the anterior side in the rotation direction of the rotating shaft.

According to this bearing device, in the region below the horizontal plane passing through the center of the rotating shaft, the lubricating oil is directed toward the minimum cross-sectional area side from the lower portion of the oil discharge passage in the rotation direction of the rotating shaft, and thus, it is possible to prevent the lubricating oil from reflowing to the region above the horizontal plane.

Moreover, in the bearing device of the present invention, the oil discharge passage has the maximum cross-sectional area continuously to the posterior side in the rotation direction of the rotating shaft.

According to this bearing device, it is possible to improve the drainability of the lubricating oil.

In addition, in the bearing device of the present invention, the oil discharge passage is formed to be gradually enlarged from the minimum cross-sectional area to the maximum cross-sectional area with the vertical plane passing through the center of the rotating shaft as a boundary.

According to this bearing device, in the region below the horizontal plane passing through the center of the rotating shaft, with the vertical plane passing through the center of the rotating shaft as a boundary, a function of preventing the lubricating oil from reflowing to the region above the horizontal plane and a function of discharging the lubricating oil from the lower portion of the oil discharge passage can be divided.

Moreover, in the bearing device of the present invention, in the oil discharge passage, the cross-sectional area is changed in the radial direction.

According to this bearing device, in a case where inhibiting factors are generated when the cross-sectional area is changed in the extension direction of the rotating shaft, it is possible to effectively change the cross-sectional area.

In addition, in the bearing device of the present invention, in the oil discharge passage, the cross-sectional area is changed in the extension direction of the rotating shaft.

According to this bearing device, in a case where inhibiting factors are generated when the cross-sectional area is changed in the radial direction of the rotating shaft, it is possible to effectively change the cross-sectional area.

In order to achieve the above-described object, according to another aspect of the present invention, there is provided an exhaust turbine turbocharger including: a turbine; a compressor; a rotating shaft which coaxially connects the turbine and the compressor to each other; a housing in which the turbine, the compressor, and the housing are accommodated; a journal bearing which is provided on the rotating shaft and rotatably supports the rotating shaft; a bearing accommodation portion which is provided in the housing to accommodate the journal bearing; an oil discharge passage which is provide in the housing to communicate with the bearing accommodation portion, is provided along a periphery of the rotating shaft, and has an opened lower portion; and any one of the above-described bearing devices.

According to this exhaust turbine turbocharger, it is possible to improve the drainability of the lubricating oil. Therefore, it is possible to decrease occurrence of a loss in the rotation of the rotating shaft caused by a viscous resistance of the lubricating oil, and it is possible to prevent a reduction in efficiency of the exhaust turbine turbocharger. In addition, it is possible to prevent the lubricating oil from leaking, and it is possible to prevent the lubricating oil from leaking from the seal surface of the turbine side of the exhaust turbine turbocharger and to decrease sealability.

Advantageous Effects of Invention

According to the present invention, it is possible to improve drainability of a lubricating oil.

DESCRIPTION OF EMBODIMENTS

Hereinafter, an embodiment according to the present invention will be described in detail with reference to the drawings. In addition, the present invention is not limited by the embodiment. In addition, constituent elements in the following embodiment include constituent elements which can be easily replaced by those skilled in the art or constituent elements which are substantially the same.

Figure 1:
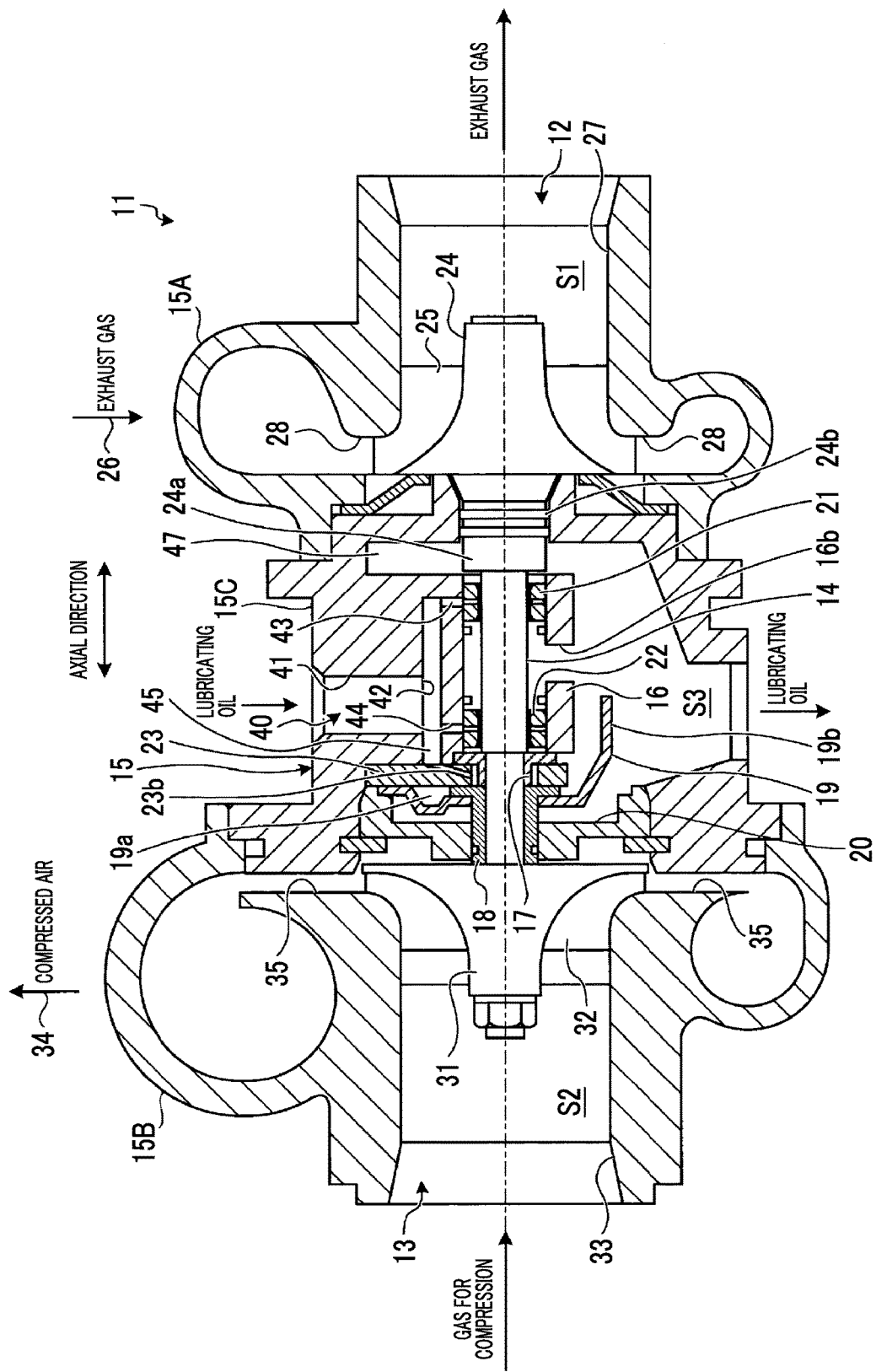
FIG. 1 is an overall configuration view of an exhaust turbine turbocharger according to an embodiment of the present invention.
Figure 2:
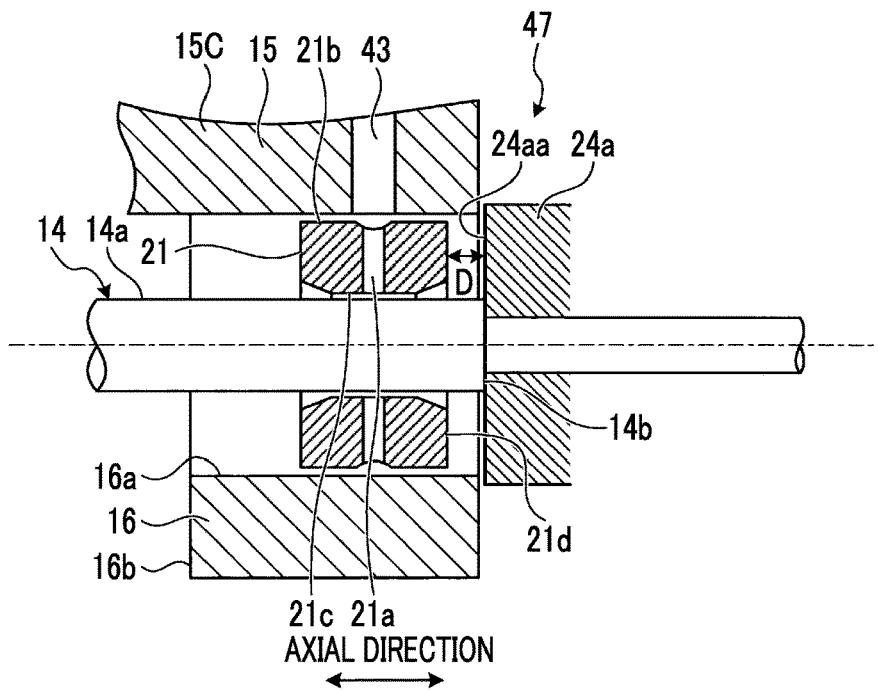
FIG. 2 is an enlarged view of a bearing portion of the exhaust turbine turbocharger according to the embodiment of the present invention.
Figure 3:
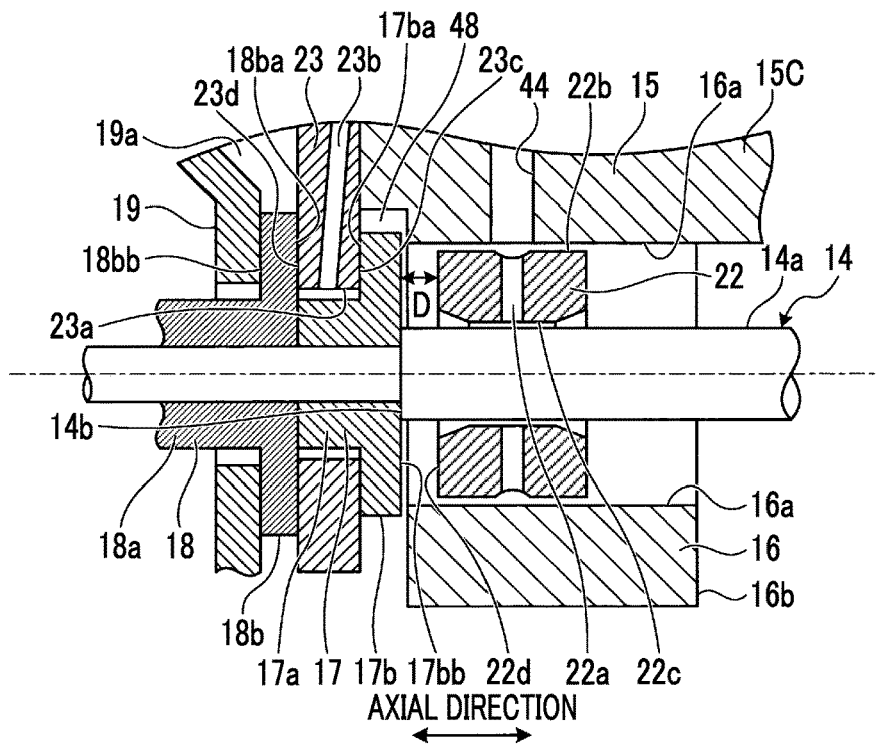
FIG. 3 is an enlarged view of the bearing portion of the exhaust turbine turbocharger according to the embodiment of the present invention.

FIG. 1 is an overall configuration view of an exhaust turbine turbocharger according to the present embodiment. FIG. 2 is an enlarged view of a bearing portion of the exhaust turbine turbocharger according to the present embodiment. FIG. 3 is an enlarged view of the bearing portion of the exhaust turbine turbocharger according to the present embodiment.

An exhaust turbine turbocharger 11 shown in FIG. 1 mainly includes a turbine 12, a compressor 13, and a rotating shaft 14, and these are accommodated in a housing 15.

An inside of the housing 15 is formed in a hollow shape, and the housing 15 includes a turbine housing 15A forming a first space portion S1 in which a configuration of the turbine 12 is accommodated, a compressor cover 15B forming a second space portion S2 in which a configuration of the compressor 13 is accommodated, and a bearing housing 15C forming a third space portion S3 in which the rotating shaft 14 is accommodated. The third space portion S3 of the bearing housing 15C is positioned between the first space portion S1 of the turbine housing 15A and the second space portion S2 of the compressor cover 15B.

In the rotating shaft 14, an end portion on the turbine 12 side is rotatably supported by a journal bearing 21 which is a turbine-side bearing, an end portion on the compressor 13 side is rotatably supported by a journal bearing 22 which is a compressor-side bearing, and a movement of the rotating shaft 14 in an axial direction in which the rotating shaft 14 extends is regulated by a thrust bearing 23. In addition, a turbine disk 24 of the turbine 12 is fixed to one end portion of the rotating shaft 14 in the axial direction. The turbine disk 24 is accommodated in the first space portion S1 of the turbine housing 15A, and a plurality of turbine blades 25 forming an axial flow type are provided on an outer peripheral portion of the turbine disk 24 with a predetermined gap therebetween in a circumferential direction. In addition, a compressor impeller 31 of the compressor 13 is fixed to the other end portion of the rotating shaft 14 in the axial direction, the compressor impeller 31 is accommodated in the second space portion S2 of the compressor cover 15B, and a plurality of blades 32 are provided on an outer peripheral portion of the compressor impeller 31 with a predetermined gap therebetween in the circumferential direction.

Moreover, the turbine housing 15A includes an inlet passage 26 of an exhaust gas and an outlet passage 27 of the exhaust gas with respect to the turbine blades 25. In addition, in the turbine housing 15A, a turbine nozzle 28 is provided between the inlet passage 26 and the turbine blades 25, an axial exhaust gas flow which is statically pressure-expanded by the turbine nozzle 28 is led to the plurality of turbine blades 25 by the turbine nozzle 28, and thus, the turbine 12 can be rotationally driven. In addition, the compressor cover 15B includes an air intake port 33 and a compressed air discharge port 34 with respect to the compressor impeller 31. In addition, in the compressor cover 15B, a diffuser 35 is provided between the compressor impeller 31 and the compressed air discharge port 34. Air compressed by the compressor impeller 31 is discharged through the diffuser 35.

In the exhaust turbine turbocharger 11 configured as described above, the turbine 12 is driven by an exhaust gas discharged from an engine (not shown), a rotation of the turbine 12 is transmitted to the rotating shaft 14 to drive the compressor 13, and the compressor 13 compresses a combustion gas to supply the compressed combustion gas to the engine. Accordingly, the exhaust gas from the engine passes through the inlet passage 26 of the exhaust gas and is statically pressure-expanded by the turbine nozzle 28, and the axial exhaust gas flow is led to the plurality of turbine blades 25. Therefore, the turbine 12 is rotationally driven via the turbine disk 24 to which the plurality of turbine blades 25 are fixed. In addition, the exhaust gas which drives the plurality of turbine blades 25 is discharged to the outside from the outlet passage 27. Meanwhile, if the rotating shaft 14 is rotated by the turbine 12, and the integral compressor impeller 31 is rotated, and air is sucked through the air intake port 33. The sucked air is compressed by the compressor impeller 31 and becomes compressed air, and the compressed air is supplied from the compressed air discharge port 34 to the engine through the diffuser 35.

In addition, in the exhaust turbine turbocharger 11, a lubricating oil supply passage 40 through which a lubricating oil is supplied to the journal bearings 21 and 22 and the thrust bearing 23 is provided in the bearing housing 15C. The lubricating oil supply passage 40 includes a first supply passage 41 formed in a radial direction on an upper portion of the bearing housing 15C, a second supply passage 42 formed in the axial direction on the upper portion of the bearing housing 15C, a third supply passage 43 which communicates with the journal bearing 21, a fourth supply passage 44 which communicates with the journal bearing 22, and a fifth supply passage 45 which communicates with the thrust bearing 23. A base end portion of the first supply passage 41 is connected to a lubricating oil tank (not shown), and a tip end portion thereof is connected to an intermediate portion of the second supply passage 42. A base end portion of the third supply passage 43 communicates with the second supply passage 42 and a tip end portion thereof communicates with the journal bearing 21. A base end portion of the fourth supply passage 44 communicates with the second supply passage 42 and a tip end portion thereof communicates with the journal bearing 22. A base end portion of the fifth supply passage 45 communicates with the second supply passage 42 and a tip end portion thereof communicates with the thrust bearing 23.

As shown in FIGS. 1 to 3, each of the journal bearings 21 and 22 is formed in a cylindrical shape. The journal bearings 21 and 22 are accommodated in a columnar space which is formed by a bearing accommodation portion 16 provided in the third space portion S3 in the bearing housing 15C. In the bearing accommodation portion 16 supporting the respective journal bearings 21 and 22, a passage 16b leading to a lower portion of the third space portion S3 between the journal bearings 21 and 22 is formed.

As shown in FIG. 2, the journal bearing 21 is rotatably supported between an outer peripheral surface 21b and an inner surface 16a of the bearing accommodation portion 16, and the journal bearing 21 rotatably supports the rotating shaft 14 between an inner peripheral surface 21c and an outer peripheral surface 14a of the rotating shaft 14. In the journal bearing 21, the tip end portion of the third supply passage 43 communicate with the outer peripheral surface 21b. In addition, in the journal bearing 21, a passage 21a penetrating the journal bearing 21 from the outer peripheral surface 21b to the inner peripheral surface 21c is formed, and the lubricating oil supplied from the third supply passage 43 to the outer peripheral surface 21b is led to a portion between the inner peripheral surface 21c and the outer peripheral surface 14a of the rotating shaft 14 through the passage 21a. Accordingly, the journal bearing 21 is rotatably supported by the bearing accommodation portion 16 using the lubricating oil supplied to the portion between the outer peripheral surface 21b and the inner surface 16a of the bearing accommodation portion 16, and the journal bearing 21 rotatably supports the rotating shaft 14 by the lubricating oil supplied to a portion between the inner peripheral surface 21c and the outer peripheral surface 14a of the rotating shaft 14.

Here, as shown in FIG. 1, the turbine disk 24 of the turbine 12 includes a boss portion 24a protruding to the compressor 13 side such that the turbine disk 24 is disposed to be adjacent to the journal bearing 21 in the axial direction. The boss portion 24a is formed in a cylindrical shape, is fitted to a portion in which an end portion of the rotating shaft 14 on the turbine 12 side is formed in a small diameter via a step portion 14b, and abuts against the step portion 14b to be positioned in the axial direction. As shown in FIG. 2, the portion of the boss portion 24a abutting against the step portion 14b is a disk member which covers an opening of a columnar space on the turbine 12 side formed by the bearing accommodation portion 16, and the boss portion 24a includes a facing portion 24aa which is disposed so as to face the side surface portion 21d of the journal bearing 21 with a gap D therebetween in the axial direction. In addition, in the bearing housing 15C, an oil discharge space chamber 47 is formed on an outer peripheral portion of the boss portion 24a. Moreover, in the turbine disk 24 of the turbine 12, a seal portion 24b is formed between the boss portion 24a and the turbine disk 24 in the axial direction. The seal portion 24b forms a seal portion with the bearing housing 15C.

In the journal bearing 21, the lubricating oil supplied to the outer peripheral surface 21b side and the inner peripheral surface 21c side flows from the passage 16b of the bearing accommodation portion 16 toward a lower portion of the third space portion S3 on the compressor 13 side. Meanwhile, in the journal bearing 21, the lubricating oil supplied to the outer peripheral surface 21b side and the inner peripheral surface 21c side flows to the side surface portion 21d side on the turbine 12 side, is fed to a radially outer side by a centrifugal force of the rotation of the rotating shaft 14 in the facing portion 24aa of the facing boss portion 24a so as to reach the oil discharge space chamber 47 on an outer peripheral portion of the boss portion 24a, and flows from the oil discharge space chamber 47 to the lower portion of the third space portion S3.

As shown in FIG. 3, the journal bearing 22 is rotatably supported between the outer peripheral surface 22b and the inner surface 16a of the bearing accommodation portion 16, and the journal bearing 22 rotatably supports the rotating shaft 14 between an inner peripheral surface 22c and the outer peripheral surface 14a of the rotating shaft 14. In the journal bearing 22, the tip end portion of the fourth supply passage 44 communicate with the outer peripheral surface 22b. In addition, in the journal bearing 22, a passage 22a penetrating the journal bearing from the outer peripheral surface 22b to the inner peripheral surface 22c is formed, and the lubricating oil supplied from the fourth supply passage 44 to the outer peripheral surface 22b is led to a portion between the inner peripheral surface 22c and the outer peripheral surface 14a of the rotating shaft 14 through the passage 22a. Accordingly, the journal bearing 22 is rotatably supported by the bearing accommodation portion 16 using the lubricating oil supplied to the portion between the outer peripheral surface 22b and the inner surface 16a of the bearing accommodation portion 16, and the journal bearing 22 rotatably supports the rotating shaft 14 by the lubricating oil supplied to a portion between the inner peripheral surface 22c and the outer peripheral surface 14a of the rotating shaft 14.

As shown in FIG. 1, the thrust bearing 23 is disposed on the compressor 13 side to be adjacent to the journal bearing 22 in the axial direction of the rotating shaft 14. As shown in FIG. 3, the thrust bearing 23 is formed in a plate shape having an insertion hole 23a into which the rotating shaft 14 is inserted and is fixed to the bearing housing 15C. The thrust bearing 23 regulates an axial movement of the rotating shaft 14 via a thrust ring 17 and a thrust sleeve 18.

As shown in FIG. 3, the thrust ring 17 includes a boss portion 17a and a flange portion 17b. The boss portion 17a is formed in a cylindrical shape, is fitted to a portion in which an end portion of the rotating shaft 14 on the compressor 13 side is formed in a small diameter via the step portion 14b, abuts against the step portion 14b to be positioned in the axial direction, and is inserted into the insertion hole 23a of the thrust bearing 23 along with the rotating shaft 14. The flange portion 17b is a disk member which protrudes radially outward from a portion of the boss portion 17a abutting against the step portion 14b, and includes one facing portion 17ba disposed to face a plate surface 23c of the thrust bearing 23 on the journal bearing 22 side in the axial direction and the other facing portion 17bb disposed to face the side surface portion 22d of the journal bearing 22 with the gap D therebetween in the axial direction.

As shown in FIG. 3, the thrust sleeve 18 includes a boss portion 18a and a flange portion 18b. The boss portion 18a is formed in a cylindrical shape, is fitted to a portion which is formed in a small diameter on the end portion of the rotating shaft 14 on the compressor 13 side, and abuts against the end surface of the boss portion 17a on the compressor 13 side in the thrust ring 17 to be positioned in the axial direction. The flange portion 18b is a disk member which protrudes radially outward from a portion of the boss portion 18a abutting against the boss portion 17a of the thrust ring 17, and includes one facing portion 18ba which is disposed to face a plate surface 23d of the thrust bearing 23 on the compressor 13 side in the axial direction and the other facing portion 18bb which is disposed to face an oil storage portion 19 forming an oil storage space 19a from the compressor 13 side toward the thrust bearing 23 side in the axial direction.

That is, each of the thrust ring 17 and the thrust sleeve 18 is disposed such that the thrust bearing 23 is interposed between the facing portions 17ba and 18ba positioned one side of the flange portions 17b and 18b. Accordingly, the thrust bearing 23 regulates the axial movement of the rotating shaft 14 via the thrust ring 17 and the thrust sleeve 18.

In addition, the oil storage portion 19 is provided to be adjacent to the compressor 13 side of the thrust bearing 23 in the axial direction, the oil storage space 19a is disposed along a periphery of the rotating shaft 14, and a lower portion of the oil storage space 19a is open and communicates with the lower portion of the third space portion S3. The oil storage portion 19 includes a tongue piece 19b which extends from the lower side of the oil storage portion 19, and the oil storage space 19a communicates with the lower portion of the third space portion S3 via the tongue piece 19b. In FIG. 1, the oil storage portion 19 is configured of a deflector. The deflector is formed of a plate shape and is attached between an insert portion 20 and the thrust bearing 23. The insert portion 20 forms a partition wall between the second space portion S2 and the third space portion S3 of the bearing housing 15C, causes the boss portion 18a of the thrust sleeve 18 to communicate with the rotating shaft 14, and supports the deflector with respect to the bearing housing 15C along with the thrust bearing 23.

In addition, a passage 23b is formed in the thrust bearing 23. A base end portion of the passage 23b communicates with the tip end portion of the fifth supply passage 45, and a tip end portion thereof communicates with the insertion hole 23a. Accordingly, the lubricating oil supplied from the fifth supply passage 45 to the insertion hole 23a via the passage 23b, and is led to portions between the respective plate surfaces 23c and 23d of the thrust bearing 23 and the respective facing portions 17ba and 18ba of the flange portions 17b and 18b. Accordingly, the thrust bearing 23 decreases a friction resistance between the facing portions 17ba and 18ba by the lubricating oil supplied to the portion between the respective facing portions 17ba and 18ba of the flange portions 17b and 18b while regulating the axial movement of the rotating shaft 14 between the facing portions 17ba and 18ba.

In the thrust bearing 23, on the facing portion 18ba side of the flange portion 18b of the thrust sleeve 18, the lubricating oil is fed to the radially outer side by the centrifugal force of the rotation of the rotating shaft 14, a portion of the lubricating oil flows to the lower portion of the third space portion S3 on the lower side of the flange portion 18b along an outer peripheral portion of the flange portion 18b, and a portion of the lubricating oil reaches the oil storage space 19a of the oil storage portion 19 (deflector). Accordingly, the lubricating oil which has reached the oil storage space 19a flows to the lower portion of the third space portion S3 along the tongue piece 19b of the oil storage portion 19. Meanwhile, on the facing portion 17ba side of the flange portion 17b of the thrust ring 17, the lubricating oil is fed to the radially outer side by the centrifugal force of the rotation of the rotating shaft 14. A clearance 48 is formed between the outer peripheral portion of the flange portion 17b and the bearing housing 15C, and the clearance 48 communicates with the lower portion of the third space portion. Accordingly, the lubricating oil fed to the radially outer side on the facing portion 17ba side flows to the lower portion of the third space portion S3 through the clearance 48.

In addition, the journal bearing 22 adjacent to the thrust bearing 23, the lubricating oil supplied to the outer peripheral surface 22b side and the inner peripheral surface 22c side flows from the passage 16b of the bearing accommodation portion 16 to the lower portion of the third space portion S3 on the turbine 12 side. Meanwhile, in the journal bearing 22 adjacent to the thrust bearing 23, the lubricating oil supplied to the outer peripheral surface 22b side and the inner peripheral surface 22c side flows to the side surface portion 22d side on the thrust bearing 23 side, is fed to the radially outer side by the centrifugal force of the rotation of the rotating shaft 14 in the facing portion 17bb of the flange portion 17b of the facing thrust ring 17, and flows to the lower portion of the third space portion S3 through the clearance 48.

In addition, although it is not shown in the drawings, in the bearing housing 15C, the base end portion of the lubricating oil discharge pipe is connected to the lower portion of the third space portion S3. A tip end portion of the lubricating oil discharge pipe is connected to an oil pan. The oil pan is connected to the lubricating oil tank, which is connected to first supply passage 41 of the lubricating oil supply passage 40, via a lubricating oil circulation line. An oil pump and an oil filter are interposed in the lubricating oil circulation line, and the lubricating oil of which impurities are filtered by the oil filter is fed from the oil pan to the lubricating oil tank via the lubricating oil circulation line by the oil pump. In addition, the lubricating oil is supplied from the lubricating oil tank to the first supply passage 41.

Hereinafter, a bearing device according to the present embodiment will be described with reference to FIGS. 4 to 8. The bearing device of the present embodiment relates to the above-described oil discharge space chamber 47.

Figure 4:
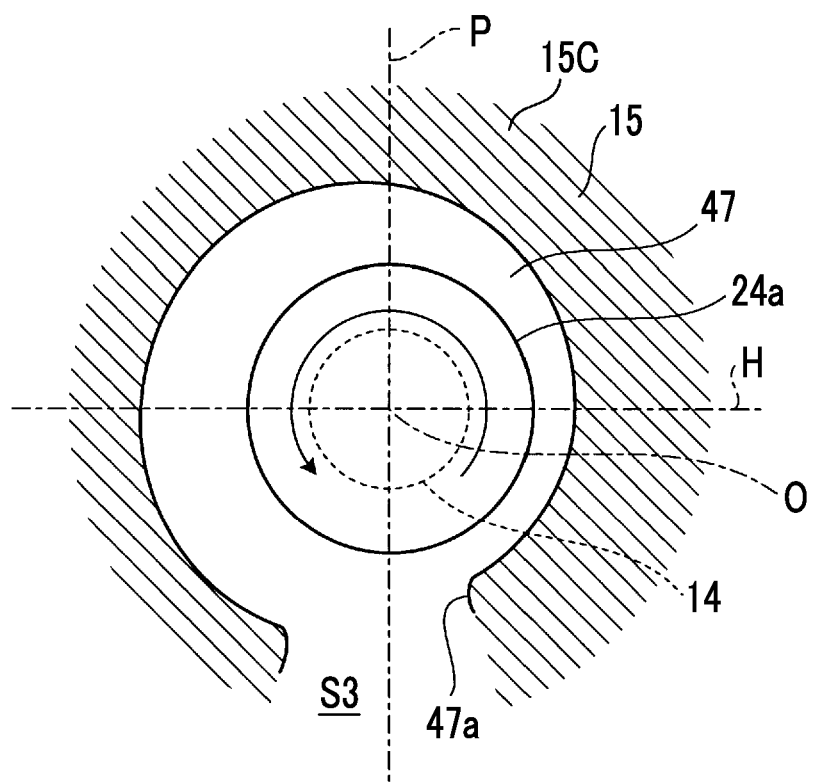
FIG. 4 is a schematic view of the bearing portion of the exhaust turbine turbocharger according to the embodiment of the present invention.
Figure 5:
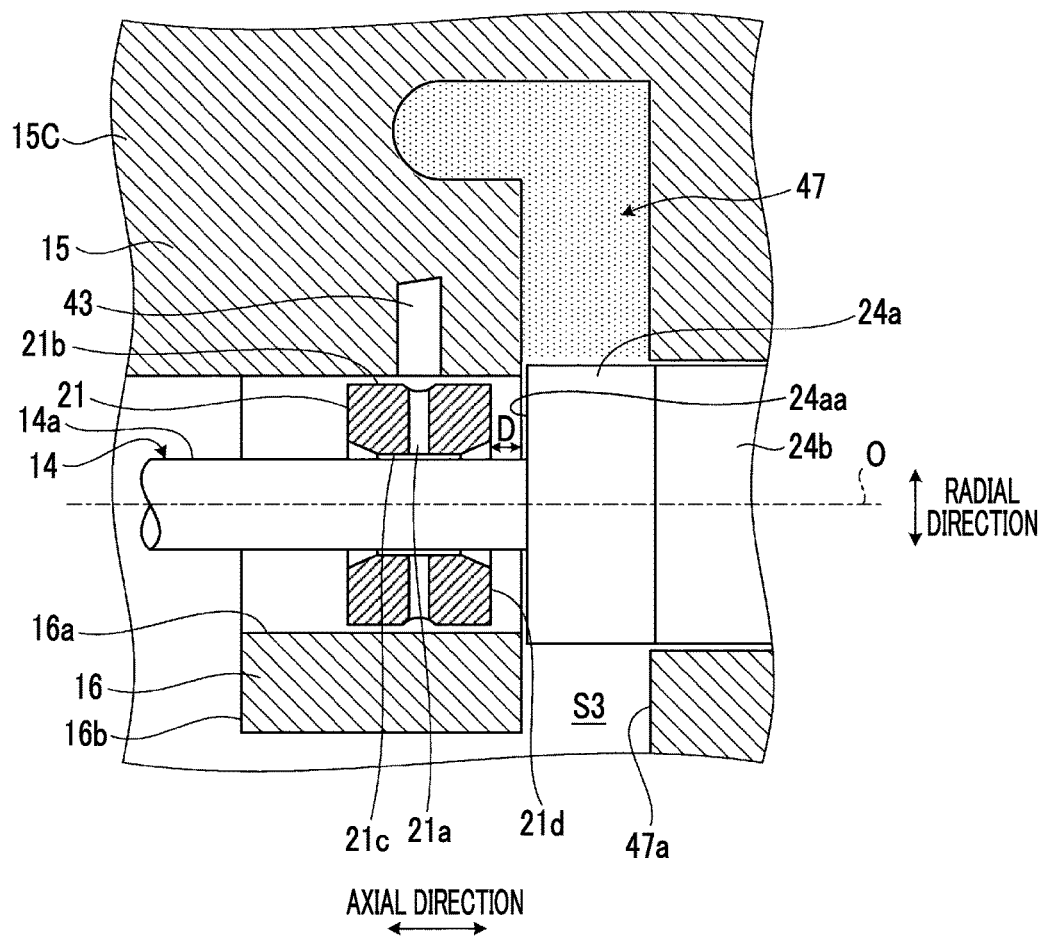
FIG. 5 is an enlarged view of the bearing portion of the exhaust turbine turbocharger according to the embodiment of the present invention.
Figure 6:
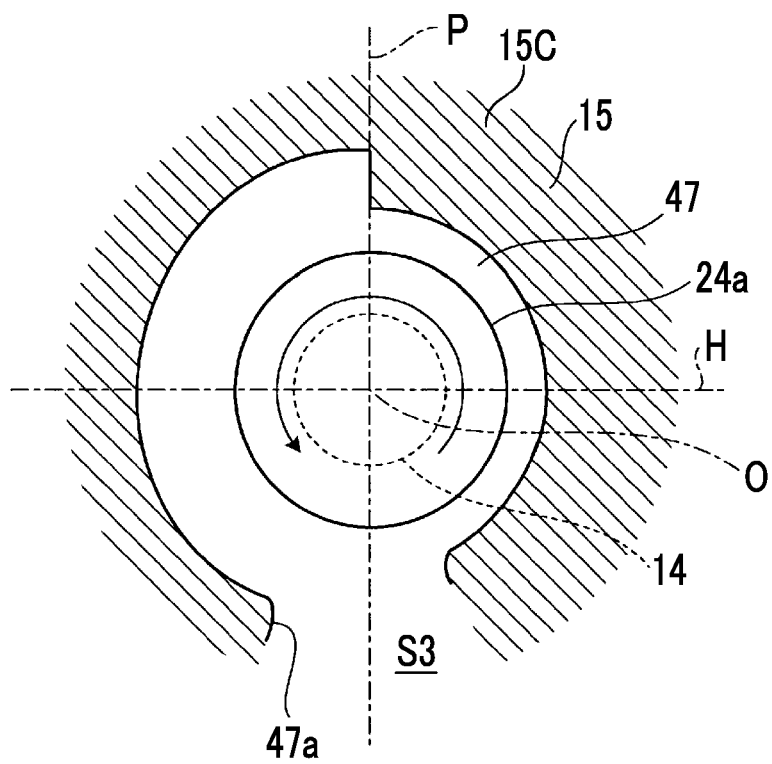
FIG. 6 is a schematic view of another example of the bearing portion of the exhaust turbine turbocharger according to the embodiment of the present invention.
Figure 7:
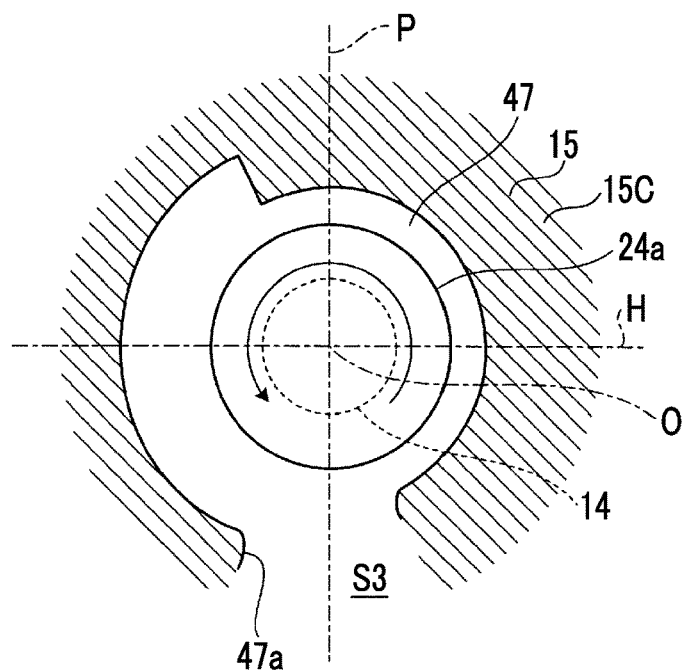
FIG. 7 is a schematic view of still another example of the bearing portion of the exhaust turbine turbocharger according to the embodiment of the present invention.
Figure 8:
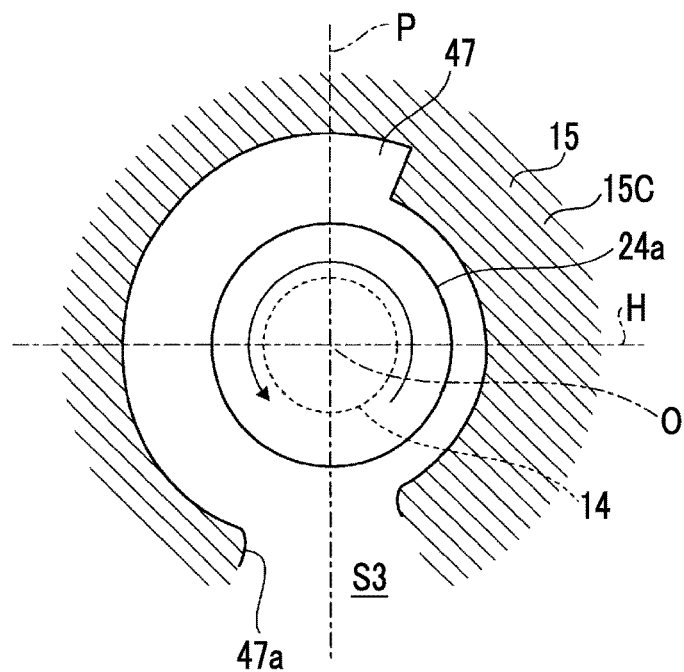
FIG. 8 is a schematic view of still another example of the bearing portion of the exhaust turbine turbocharger according to the embodiment of the present invention.

FIG. 4 is a schematic view of the bearing portion of the exhaust turbine turbocharger according to the present embodiment. FIG. 5 is an enlarged view of the bearing portion of the exhaust turbine turbocharger according to the embodiment. FIG. 6 is a schematic view of another example of the bearing portion of the exhaust turbine turbocharger according to the present embodiment. FIG. 7 is a schematic view of still another example of the bearing portion of the exhaust turbine turbocharger according to the embodiment of the present invention. FIG. 8 is a schematic view of still another example of the bearing portion of the exhaust turbine turbocharger according to the embodiment of the present invention.

As described above, in the journal bearing 21, on the turbine 12 side, the lubricating oil supplied to the outer peripheral surface 21b side and the inner peripheral surface 21c side flows the side surface portion 21d side, is fed to a radially outer side by a centrifugal force of the rotation of the rotating shaft 14 in the facing portion 24aa of the facing boss portion 24a so as to reach the oil discharge space chamber 47 on an outer peripheral portion of the boss portion 24a, and flows from the oil discharge space chamber 47 to the lower portion of the third space portion S3. In this way, the oil discharge space chamber 47 is configured as an oil discharge passage.

If the oil discharge space chamber 47 serving as the oil discharge passage is described, as shown in FIGS. 4 to 8, the oil discharge space chamber 47 is a space portion which is provided in the bearing housing 15C, is provided along the periphery of the rotating shaft 14 on the outer peripheral portion of the boss portion 24a of the turbine disk 24 in the turbine 12, and is annularly formed along the outer peripheral surface of the boss portion 24a. The oil discharge space chamber 47 includes an opening portion 47a having a lower portion which is open, the opening portion 47a communicates with the third space portion S3 of the bearing housing 15C, and communicates with the bearing accommodation portion 16 accommodated in the journal bearing 21, and thus, the lubricating oil supplied to the journal bearing 21 can be discharged to the third space portion S3.

As shown in FIGS. 4 and 6 to 8, in a region above a horizontal plane H passing through a center O of the rotating shaft 14, the oil discharge space chamber 47 serving as the oil discharge passage has the minimum cross-sectional area in a radial cross section on an anterior side in a rotation direction of the rotating shaft 14 based on a vertical plane P passing through the center O of the rotating shaft 14 and has the maximum cross-sectional area in the radial cross section on a posterior side in the rotation direction of the rotating shaft 14 based on the vertical plane P passing through the center O of the rotating shaft 14.

Here, the rotation direction of the rotating shaft is a counterclockwise direction shown by an arrow in FIGS. 4 and 6 to 8. In addition, the anterior side in the rotation direction of the rotating shaft 14 is a front side in the rotation direction, and becomes a right side of the vertical plane P in FIGS. 4 and 6 to 8 based on the vertical plane P passing through the center O of the rotating shaft 14 in the region above the horizontal plane H passing through the center O of the rotating shaft 14. In addition, the posterior side in the rotation direction of the rotating shaft 14 is a side in front of the rotation direction, and becomes a left side of the vertical plane P in FIGS. 4 and 6 to 8 based on the vertical plane P passing through the center O of the rotating shaft 14 in the region above the horizontal plane H passing through the center O of the rotating shaft 14. In addition, the radial cross section is a cross section in a radial direction based on the center O of the rotating shaft 14, and the cross-sectional area is an area (for example, a region shown by a hatching in FIG. 5) which is surrounded by the inner surface of the oil discharge space chamber 47 formed on the bearing housing 15C side and the outer peripheral surface of the boss portion 24a of the turbine disk 24 in the radial cross section.

In addition, as shown in FIG. 5, the cross section in the radial cross section of the oil discharge space chamber 47 may be changed in the radial direction, may be changed in an extension direction of the rotating shaft 14, or may be changed in the radial direction and the extension direction of the rotating shaft 14, and may appropriately select an aspect corresponding to the shape of the bearing housing 15C or an aspect for avoiding an interference with the lubricating oil supply passage 40 provided in the bearing housing 15C. In FIGS. 4 and 6 to 8, in order to make it easy to understand the change of the cross-sectional area in the radial cross section of the oil discharge space chamber 47, the aspect where the cross-sectional area is changed in the extension direction of the rotating shaft 14 is shown. However, the present invention includes case where the cross-sectional area is changed in the radial direction.

In the aspect shown in FIG. 4, the oil discharge space chamber 47 is formed to be gradually enlarged from the minimum cross-sectional area to the maximum cross-sectional area in the rotation direction of the rotating shaft 14. Although it is not shown in the drawings, the gradual enlargement includes an aspect in which the cross-sectional area is gradually enlarged stepwise from the minimum cross-sectional area to the maximum cross-sectional area, in addition to the aspect shown in FIG. 4 in which the cross-sectional area is gradually enlarged smoothly from the minimum cross-sectional area to the maximum cross-sectional area. In FIG. 4, the minimum cross-sectional area and the maximum cross-sectional area are positioned at positions on the horizontal plane H. Below the horizontal plane H, any cross-sectional area may be set. However, in FIG. 4, the cross-sectional area is the minimum cross-sectional area from the opening portion 47a on the anterior side in the rotation direction of the rotating shaft 14 based on the vertical plane P, and the cross-sectional area is in the maximum cross-sectional area toward the opening portion 47a on the posterior side in the rotation direction of the rotating shaft 14 based on the vertical plane P.

Moreover, although it is not shown in the aspect of FIG. 4, in the region above the horizontal plane H passing through the center O of the rotating shaft 14, the minimum cross-sectional area may exist in the middle of the anterior side in the rotation direction of the rotating shaft 14 or may exist on the vertical plane P based on the vertical plane P passing through the center O of the rotating shaft 14. In this case, on the anterior side in the rotation direction of the rotating shaft 14 from the minimum cross-sectional area, the minimum cross-sectional area may be continued, or the cross-sectional area may increase within a range which does not reach the maximum cross-sectional area.

Moreover, although it is not shown in the aspect of FIG. 4, in the region above the horizontal plane H passing through the center O of the rotating shaft 14, the maximum cross-sectional area may exist in the middle of the posterior side in the rotation direction of the rotating shaft 14 or may exist on the vertical plane P based on the vertical plane P passing through the center O of the rotating shaft 14. In this case, on the posterior side in the rotation direction of the rotating shaft 14 from the maximum cross-sectional area, the maximum cross-sectional area may be continued, or the cross-sectional area may increase within a range which does not reach the minimum cross-sectional area.

In the aspect shown in FIG. 6, the oil discharge space chamber 47 is formed so as to be abruptly enlarged from the minimum cross-sectional area to the maximum cross-sectional area in the rotation direction of the rotating shaft 14. As shown in FIG. 6, the abrupt enlargement means a configuration in which there is no interval from the minimum cross-sectional area to the maximum cross-sectional area and the cross-sectional area is abruptly enlarged from the minimum cross-sectional area to the maximum cross-sectional area. In FIG. 6, the minimum cross-sectional area and the maximum cross-sectional area are positioned on the vertical plane P, and the cross-sectional area is changed on the vertical plane P.

In addition, in the aspect shown in FIG. 6, the oil discharge space chamber 47 has the minimum cross-sectional area continuously to the anterior side in the rotation direction of the rotating shaft 14. Here, the minimum cross-sectional area is provided continuously to the anterior side in the rotation direction of the rotating shaft 14 from the opening portion 47a below the horizontal plane H. However, any cross-sectional area may be provided below the horizontal plane H. Moreover, although it is not shown in the aspect of FIG. 6, in the region above the horizontal plane H passing through the center O of the rotating shaft 14, the cross-sectional area may be enlarged within a range which does not reach the maximum cross-sectional area on the anterior side in the rotation direction of the rotating shaft 14 from the minimum cross-sectional area.

In addition, in the aspect shown in FIG. 6, the oil discharge space chamber 47 has the maximum cross-sectional area continuously to the posterior side in the rotation direction of the rotating shaft 14. Here, the maximum cross-sectional area is provided continuously to the posterior side in the rotation direction of the rotating shaft 14 toward the opening portion 47a below the horizontal plane H. However, any cross-sectional area may be provided below the horizontal plane H. Moreover, although it is not shown in the aspect of FIG. 6, in the region above the horizontal plane H passing through the center O of the rotating shaft 14, the cross-sectional area may be reduced within a range which does not reach the minimum cross-sectional area on the posterior side in the rotation direction of the rotating shaft 14 from the maximum cross-sectional area.

An aspect shown in FIG. 7 is a modification example of the aspect shown in FIG. 6, an oil discharge space chamber 47 is formed so as to be abruptly enlarged from the minimum cross-sectional area to the maximum cross-sectional area in the rotation direction of the rotating shaft 14. In FIG. 7, in the region above the horizontal plane H, the minimum cross-sectional area continuously reaches the intermediate portion on the posterior side from the anterior side in the rotation direction of the rotating shaft 14 of the vertical plane P, and at this position, the cross-sectional area is changed to the maximum cross-sectional area.

An aspect shown in FIG. 8 is a modification example of the aspect shown in FIG. 6, an oil discharge space chamber 47 is formed so as to be abruptly enlarged from the minimum cross-sectional area to the maximum cross-sectional area in the rotation direction of the rotating shaft 14. In FIG. 8, in the region above the horizontal plane H, the maximum cross-sectional area continuously reaches the posterior side from the intermediate portion of the anterior side in the rotation direction of the rotating shaft 14 of the vertical plane P, and at this position, the cross-sectional area is changed from the minimum cross-sectional area.

In this way, in the bearing device of the present embodiment, as shown in FIGS. 4 and 6 to 8, in the region above the horizontal plane H passing through the center O of the rotating shaft 14, the oil discharge space chamber serving as the oil discharge passage has the minimum cross-sectional area in the radial cross section on the anterior side in the rotation direction of the rotating shaft 14 based on the vertical plane P passing through the center O of the rotating shaft 14 and has the maximum cross-sectional area in the radial cross section on the posterior side in the rotation direction of the rotating shaft 14 based on the vertical plane P passing through the center O of the rotating shaft 14.

According to this bearing device, the lubricating oil which has reached the oil discharge space chamber 47 flows in the rotation direction of the rotating shaft 14. In addition, the lubricating oil flowing through the region above the horizontal plane H passing through the center O of the rotating shaft 14 flows from the minimum cross-sectional area side of the oil discharge space chamber 47 to the maximum cross-sectional area side and is discharged from the opening portion 47a of the lower portion of the oil discharge space chamber 47. In addition, in the region below the horizontal plane H passing through the center O of the rotating shaft 14, the lubricating oil is directed toward the minimum cross-sectional area side from the lower portion of the oil discharge space chamber 47 in the rotation direction of the rotating shaft 14, and thus, it is possible to prevent the lubricating oil from reflowing to the region above the horizontal plane H. As a result, it is possible to drainability of the lubricating oil.

Accordingly, it is possible to decrease occurrence of a loss in the rotation of the rotating shaft 14 caused by a viscous resistance of the lubricating oil, and it is possible to prevent a reduction in efficiency of the exhaust turbine turbocharger 11. In addition, it is possible to prevent the lubricating oil from leaking, and it is possible to prevent the lubricating oil from leaking from the seal surface of the turbine 12 side of the exhaust turbine turbocharger 11 and to decrease sealability.

In addition, in the bearing device of the present embodiment, as shown in FIG. 4, the oil discharge space chamber 47 is formed to be gradually enlarged from the minimum cross-sectional area to the maximum cross-sectional area in the rotation direction of the rotating shaft 14.

According to this bearing device, the lubricating oil which has reached the oil discharge space chamber 47 flows through the passage which is gradually enlarged in the rotation direction of the rotating shaft 14 from the minimum cross-sectional area to the maximum cross-sectional area, and is discharged from the opening portion 47a of the lower portion of the oil discharge space chamber 47. As a result, it is possible to improve the drainability of the lubricating oil.

In addition, in the bearing device of the present embodiment, as shown in FIGS. 6 to 8, the oil discharge space chamber 47 is formed so as to be abruptly enlarged from the minimum cross-sectional area to the maximum cross-sectional area in the rotation direction of the rotating shaft 14.

According to this bearing device, the lubricating oil which has reached the oil discharge space chamber 47 flows through the passage which is abruptly enlarged in the rotation direction of the rotating shaft 14 from the minimum cross-sectional area to the maximum cross-sectional area, and is discharged from the opening portion 47a of the lower portion of the oil discharge space chamber 47. As a result, it is possible to improve the drainability of the lubricating oil.

Moreover, in the bearing device of the present embodiment, as shown in FIGS. 6 to 8, the oil discharge space chamber 47 has the minimum cross-sectional area continuously to the anterior side in the rotation direction of the rotating shaft 14.

According to this bearing device, in the region below the horizontal plane H passing through the center O of the rotating shaft 14, the lubricating oil is directed toward the minimum cross-sectional area side from the lower portion of the oil discharge space chamber 47 in the rotation direction of the rotating shaft 14, and thus, it is possible to prevent the lubricating oil from reflowing to the region above the horizontal plane H.

In addition, in the bearing device of the present embodiment, as shown in FIGS. 6 to 8, the oil discharge space chamber 47 has the maximum cross-sectional area continuously to the posterior side in the rotation direction of the rotating shaft 14.

According to this bearing device, it is possible to improve the drainability of the lubricating oil.

Moreover, in the bearing device of the present embodiment, as shown in FIG. 6, the oil discharge space chamber 47 is formed to be gradually enlarged from the minimum cross-sectional area to the maximum cross-sectional area with the vertical plane P passing through the center O of the rotating shaft 14 as a boundary.

According to this bearing device, in the region below the horizontal plane H passing through the center O of the rotating shaft 14, with the vertical plane P passing through the center O of the rotating shaft 14 as a boundary, a function of causing the lubricating oil to reflow to the region above the horizontal plane H and a function of discharging the lubricating oil from the lower portion of the oil discharge space chamber 47 can be divided.

Moreover, in the bearing device of the present embodiment, in the oil discharge space chamber 47, the cross-sectional area is changed in the radial direction.

According to this bearing device, in a case where inhibiting factors are generated when the cross-sectional area is changed in the extension direction of the rotating shaft 14, it is possible to effectively change the cross-sectional area.

Moreover, in the bearing device of the present embodiment, in the oil discharge space chamber 47, the cross-sectional area is changed in the extension direction of the rotating shaft 14.

According to this bearing device, in a case where inhibiting factors are generated when the cross-sectional area is changed in the radial direction of the rotating shaft 14, it is possible to effectively change the cross-sectional area. Particularly, in a case where the cross-sectional area is changed in the extension direction of the rotating shaft, for example, the cross-sectional area is changed in the extension direction of the rotating shaft 14 so as to be separated from the turbine 12 side in the exhaust turbine turbocharger 11. Accordingly, the lubricating oil is away from the seal surface on the turbine 12 side of the exhaust turbine turbocharger 11, and thus, it is possible to prevent sealability from decreasing.

REFERENCE SIGNS LIST

11: exhaust turbine turbocharger
12: turbine
13: compressor
14: rotating shaft
15: housing
16: bearing accommodation portion
21: journal bearing
24: turbine disk
24a: boss portion
24b: seal portion
47: oil discharge space chamber (oil discharge passage)
47a: opening portion
H: horizontal plane
O: center of rotating shaft
P: vertical plane

The invention claimed is:

1. A bearing device comprising:
a rotating shaft;
a journal bearing which is provided on the rotating shaft and rotatably supports the rotating shaft;
a bearing accommodation portion in which the journal bearing is accommodated; and
an oil discharge passage which is provided along a periphery of the rotating shaft on an outer peripheral portion of a boss portion of a turbine disk fixed to the rotating shaft and has an opened lower portion,
wherein the journal bearing is rotatably supported by the bearing accommodation portion using a lubricating oil supplied to a portion between an outer peripheral surface of the journal bearing and an inner surface of the bearing accommodation portion and rotatably supports the rotating shaft by the lubricating oil supplied to a portion between an inner peripheral surface of the journal bearing and an outer peripheral surface of the rotating shaft, and a side surface portion of the journal bearing faces a facing portion of the boss portion with a gap in the bearing accommodation portion, wherein the lubricating oil reaches the oil discharge passage to communicate with the bearing accommodation portion between the side surface portion of the journal bearing and the facing portion of the boss on the outer peripheral portion of the boss, and in a region above a horizontal plane passing through a center of the rotating shaft, the oil discharge passage has the minimum cross-sectional area in a radial cross section on an anterior side in a rotation direction of the rotating shaft based on a vertical plane passing through the center of the rotating shaft and has the maximum cross-sectional area in the radial cross section on a posterior side in the rotation direction of the rotating shaft based on the vertical plane passing through the center of the rotating shaft, wherein the oil discharge passage is formed to be continuously enlarging from the minimum cross-sectional area to the maximum cross-sectional area with the vertical plane passing through the center of the rotating shaft as a boundary.

2. The bearing device according to claim 1, wherein in the oil discharge passage, a cross-sectional area in the radial cross section is changed in an extension direction of the rotating shaft.

3. An exhaust turbine turbocharger comprising:

a turbine;

a compressor;

and the bearing device according to claim 1.

* * * * *